Jan. 13, 1959 E. B. GITHENS 2,867,864
CORNER CONSTRUCTION AND METHOD OF FORMING SAME
Filed July 13, 1955 2 Sheets-Sheet 1
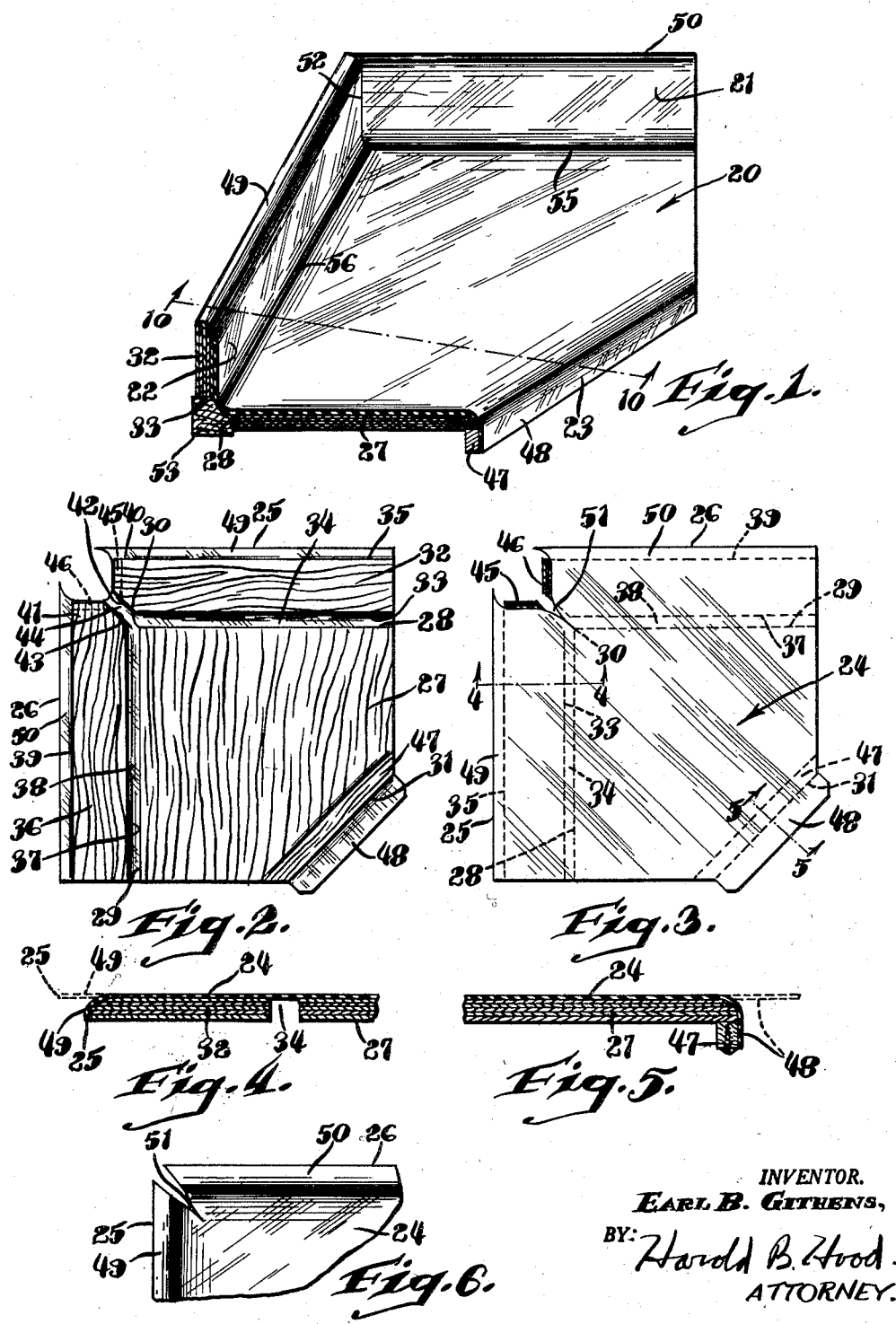
INVENTOR.
EARL B. GITHENS,
BY: Harold B. Hood.
ATTORNEY.

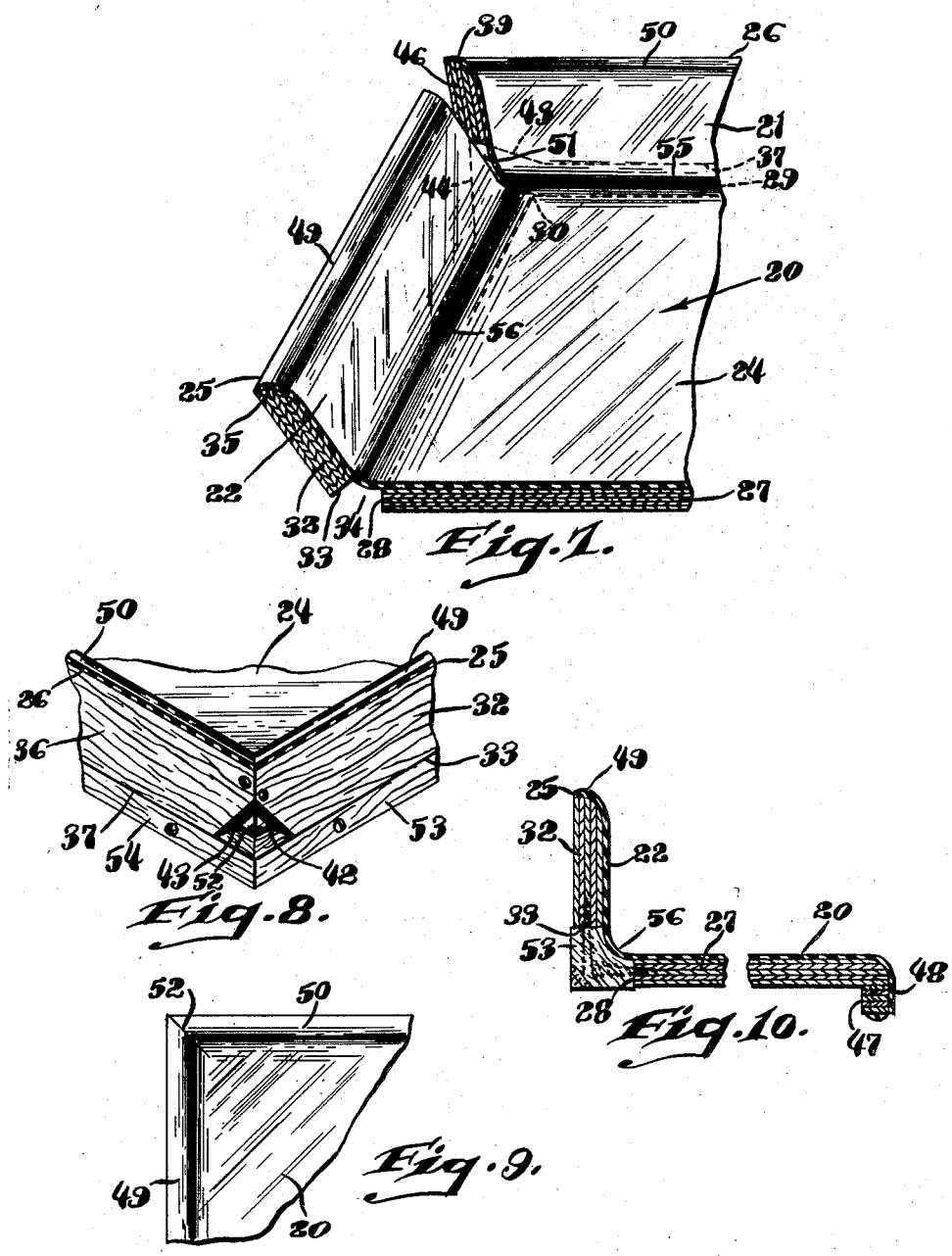

United States Patent Office 2,867,864
Patented Jan. 13, 1959

2,867,864

CORNER CONSTRUCTION AND METHOD OF FORMING SAME

Earl B. Githens, Indianapolis, Ind., assignor to Cabinet Top Industries, Indianapolis, Ind., a copartnership consisting of Earl B. Githens and Melba S. Githens Application July 13, 1955, Serial No. 521,712

5 Claims. (Cl. 20—92)

The present invention relates to a corner construction, and method of forming the same, and is particularly concerned with the provision of a smooth, clean juncture among three intersecting planes, in which the exposed surface constitutes a unitary sheet of bendable, substantially inductile material. Specifically, the invention finds its primary utility, and therefore will be described, in connection with kitchen work counters, which may or may not be associated with sinks, wherein it is desired to provide a generally horizontal work surface bounded, on two or more sides, by upstanding splash guards, and in which it is desirable that the work surface, the vertical surfaces of the splash guards, and the upper edges of the splash guards shall be formed from an integral sheet of material such as, for example, woven fabric or porous paper, impregnated with a thermosetting resin such as phenol, urea, or melamine formaldehyde resin, or phenol furfural resin. The resin may be pure phenol, ortho, meta, or para-cresol, or one of the various xylenols, or analine. These resins are conventionally called "aldehyde condensation resins." Sheet materials of this class, in the stage in which they are commonly designated as "C-stage" thermosetting materials, are readily bendable only under carefully controlled conditions; and they are substantially inductile, so that they cannot be successfully drawn to cupped shapes. One satisfactory method for so bending such materials is disclosed in the patent to Beach, et al. 2,433,643 issued December 30, 1947.

Prior to my invention, procedures have been known whereby a work surface and bounding splash surfaces substantially perpendicularly related to the work surface and to each other, could be formed from materials similar to those with which the present invention is concerned; but, so far as I am advised, in all such previousy known procedures, it has been necessary to provide an intermediate fillet surface of substantial extent between the adjacent ends of angularly related splash plates, as, for instance, in the structure disclosed in the patent to Everhart, et al. No. 2,674,768 issued April 13, 1954, and/or to provide means separate from the sheet material which forms the primary surfaces, to enrobe the upper, exposed edges of the splash plates. According to the present invention, I provide a structure of the character under consideration in which the upper edges of the splash plates are enshrouded by the single sheet of thermosetting material which forms, also, the work surface and the splash guard surfaces; and I provide a tight, clean joint, in the said material, directly at the juncture between the surfaces of the splash guards, and extending into the coved region between the horizontal and vertical surfaces, such joint being disposed in a single plane substantially perpendicular to the horizontal work surface.

The objects of the present invention, then, may be stated to be the provision of a joint of the above character in a unitary sheet of material of the character above described, together with a means or method for producing such a joint or corner construction.

To the accomplishment of the above and related objects, my invention may be embodied in the form illustrated in the accompanying drawings, attention being called to the fact, however, that the drawings are illustrative only, and that change may be made in the specific construction illustrated and described, and in the specific steps stated, so long as the scope of the appended claims is not violated.

Fig. 1 is a fragmentary perspective view of a sink counter construction embodying my invention;

Fig. 2 is a bottom plan view of a blank of the character used in practicing my invention;

Fig. 3 is a top plan view of said blank, the blank having been rotated through 180° about a diagonal axis;

Fig. 4 is a fragmentary section, taken substantially on the line 4, 4 of Fig. 3, and drawn to an enlarged scale;

Fig. 5 is a similarly enlarged section taken substantially on the line 5, 5 of Fig. 3;

Fig. 6 is a fragmentary plan view of the blank of Fig. 3 in an intermediate stage in the manipulation of said blank toward the condition of Fig. 1;

Fig. 7 is a fragmentary perspective, showing the elements of the blank substantially in the stage of Fig. 6;

Fig. 8 is a fragmentary perspective view taken from the outside of the corner construction after completion of such construction;

Fig. 9 is a view similar to Fig. 6 but showing the organization after completion of its construction; and Fig. 10 is a sectional view taken substantially on the line 10, 10 of Fig. 1, and drawn to an enlarged scale.

In Fig. 1 is pictorially illustrated one corner of a finished sink counter construction presenting a substantially horizontal deck or work surface 20 guarded, on two adjacent edges, by upstanding splash guard surfaces 21 and 22; and provided with a downturned lip 23 for cooperative registry with a sink (not shown) which may be inset somewhere in the extent of the deck or counter 20. It will be understood, of course, that the details of the selected counter construction are unimportant to the present invention, that the illustration of the lip 23 is only exemplary, and that the forward edge (not shown) of the counter surface may be provided with a downturned lip, may or may not be guarded by a kerf, or may be enrobed in any desired material foreign to the sheet material with which the present invention is concerned.

A planar sheet 24 of material of the character above described, one example of which is commercially known and available as "Formica," of the proper size and contour, but having at least two adjacent, substantially perpendicularly-related edges 25 and 26, is suitably supported with its rear face accessible for manipulation, in the manner generally suggested in Fig. 2. A substantially rigid deck member 27 is now placed on the exposed surface of the sheet 24, said deck member being of suitable contour, but being provided with adjacent edges 28 and 29 which are likewise substantially perpendicularly-related, and which meet in a corner 30. The edges 28 and 29 are suitably spaced from the edges 25 and 26 of the sheet 24 to allow for the subsequent steps, to be described; but the edges 28 and 29 of the deck member 27 will be respectively parallel with, and spaced from, the sheet edges 25 and 26. If a sink opening, of the character suggestion in the drawings, is to be provided, the deck member will be formed with a further edge, such as 31, which may be angularly related to the edges 28 and 29. The deck member 27 is suitably bonded to the rear face of the sheet 24 as, for instance, by means of any suitable adhesive, many of which are familiar to the art.

Now, a plate 32 is arranged upon the sheet 24 between the edge 28 of the deck member and the parallel edge 25 of the sheet. The plate 32 is formed to provide a longitudinal edge 33 which is placed parallel with, but suitably spaced from, the edge 28 to define a channel or coving space 34; and to provide a longitudinal outer edge 35, parallel with the edge 33, and therefore with the sheet edge 25, and spaced inwardly from said sheet edge by a dimension at least equal to the thickness of the plate 32. Preferably, though not necessarily, the thickness of the plate 32 will be substantially equal to the thickness of the deck member 27. The plate 32 is bonded to the sheet 24 in any suitable manner.

A plate 36, similar to the plate 32, is now arranged on the sheet 24 with its longitudinal edge 37 parallel with, and spaced from, the edge 29 of the deck member, to define a channel or coving space 38. The outer edge 39 of the plate 36 is parallel with the sheet edge 26, and is spaced inwardly therefrom by a dimension at least equal to the thickness of the plate 36.

As is clearly shown in Fig. 2, the adjacent ends 40 and 41 of the plates 32 and 36 respectively overlap the channels 38 and 34; and their adjacent corners are cut away, as at 42 and 43 to define a channel 44 whose center line substantially bisects the angle included between the plate edges 35 and 39 and meets the corner 30 of the deck member 27.

The adjacent extremities of the plates 32 and 36 are bevelled, as at 45 and 46, rearwardly and toward the surface of the sheet 24, at angles of 45°, for a reason which will appear.

The edges 35 and 39 of the plates 32 and 36 are radiused in the manner clearly illustrated in Figs. 1, 4, 7 and 10. In the illustrated embodiment of the invention, a block 47 is secured to the under surface of the deck member 27 at the boundary of the sink opening, to sustain the lip 48 when the latter is bent from its dotted line position to its solid line position as indicated in Fig. 5.

The corner region of the sheet 24, between the ends 40 and 41 of the plates 32 and 36 is cut or relieved, preferably in the manner most clearly illustrated in Fig. 2, either before arrangement of the members 27, 32 and 36, or immediately thereafter, to free the outboard regions 49 and 50 of the sheet 24 for independent manipulation. Now, those outboard regions are bent to enrobe the radiused edges 35 and 39 of the plates 32 and 36, and are suitably bonded to said edges. This operation is suggested by the dotted lines and solid lines in Fig. 4. If necessary, the sheet edges 25 and 26 are trimmed flush with the rear surfaces of the plates 32 and 36.

Thereupon, the sheet is trimmed flush with the extremities of the edges 35 and 39 and with the remote boundaries (illustrated in dotted lines in Fig. 2) of the bevelled surfaces 45 and 46; and a tapered notch or slot is cut in the region 44, extending from the adjacent ends of the dotted line boundaries of the bevelled plate ends to the corner 30 of the deck member 27, as illustrated at 51 in Fig. 3.

Now, the sheet 24 is bent along the center lines of the channels 34 and 38, to swing the plates 32 and 36 forwardly into upstanding positions relative to the deck surface 20. The material of the sheet 24 is not well adapted to sharp bending, and therefore the forming mechanism used for thus swinging the plates 32 and 36 is so designed as to produce coved regions 55 and 56 through which the upstanding surfaces 21 and 22 merge with the surface 20.

As the plates 32 and 36 are so swung, the tapered slot 51 gradually closes, and the surfaces 45 and 46 at the adjacent ends of the plates 32 and 36 move into mutual abutment, the cut-away portions 42 and 43 moving into the relationship most clearly illustrated in Fig. 8 for the accommodation of the protrusion in which the coved regions 55 and 56 meet each other. Since the material of the sheet 24 has been trimmed, as described above, to flush relationship with the upper edges 35 and 39 of the plates 32 and 36, and with the remote boundaries of the bevelled surfaces 45 and 46, the trimmed edges of the surfaces 21 and 22 will meet in a tight, clean joint 52, most clearly appearing in Figs. 1 and 9, when the bevelled surfaces 45 and 46 thus move into abutment with each other. It will be seen that the joint 52 extends through the juncture between the outwardly or rearwardly curved outboard portions 49 and 50 of the sheet 24, and through the juncture between the coved regions 55 and 56.

The plates 32 and 36 may be solidly joined by means of screws, as indicated in Fig. 8; and preferably fillet elements 53 and 54 will be secured to the deck member 27 and to the adjacent edges of the plates 32 and 36, respectively, in the manner most clearly illustrated in Figs. 1, 8 and 10, in order to provide a finished external appearance and to support the coved regions 55 and 56.

If desired, any slight defects in the tight fit between the elements of the joint 52 may be filled with caulking material and/or a suitable bonding adhesive, in order to render the joint completely water tight.

I claim as my invention:

1. A work surface corner construction comprising a single piece of bendable, substantially inductile sheet material, said piece of sheet material comprising three portions, each such portion having a rigid backing element secured to its reverse surface, said several backing elements being spaced from each other, and each such portion having a forward exposed surface lying in a plane which intersects the plane of each of the others, the surface of each of two of said portions merging with the surface of the third portion along a coved section, the outboard region of each of said two portions being curved, said two portions and the coved sections and the curved regions meeting at a continuously closed joint lying in a plane perpendicular to the plane of the surface of said third portion.

2. The method of producing a composite sheet structure having adjacent portions lying in three separate, intersecting planes, which includes the steps of securing, to a continuous, planar sheet of bendable, substantially inductile material, a rigid backing element for each such portion, said backing elements being spaced from each other and from the perimetral edges of said sheet, bending the perimetral edge portions of said sheet to overlie the adjacent edges of two of said backing members, then trimming away that portion of the sheet which lies between the adjacent ends of said two backing members to define a tapering slot extending substantially to the adjacent corner of the third backing member, and then bending the sheet inwardly in the regions lying between said third backing member and said two backing members to swing said two backing members respectively into planes intersecting each other and the plane of said third backing member and to bring into abutting relation the adjacent ends of said two backing members and the edges of said slot.

3. The method of producing a corner construction from a planar sheet of bendable, substantially inductile material having two adjacent, substantially perpendicular edges, which includes the steps of securing to the rear face of such a sheet a deck member having two adjacent, substantially perpendicular edges parallel with, and spaced inwardly from said sheet edges, securing to said face a plate having an inner, longitudinal edge spaced outwardly from, and parallel with, one of said deck member edges, and having an outer edge parallel with its inner edge and spaced inwardly from the parallel edge of said sheet by a dimension at least equal to the thickness of said plate, securing to said face a second plate having an inner, longitudinal edge spaced outwardly from, and parallel with, the other of said deck member edges, and having an outer edge parallel with its inner edge and spaced inwardly from the parallel edge of said sheet by a dimension at least equal to the thickness of said second plate, an end of each of said plates overlapping the space between the other plate and the deck member and having its inner corner cut away to define a channel, of a width substantially equal to the spacing between each plate and the deck member, and substantially bisecting the angle between said sheet edges, each of said plate ends further being bevelled, substantially at 45° angles, toward said sheet and away from the other plate, cutting the sheet, in the region between the adjacent plate ends, to free those portions of the sheet projecting beyond the outer edges of said plates for independent bending out of the plane of said sheet, bending said last-mentioned sheet portions rearwardly out of said plane to overlie said plate outer edges, then trimming away the sheet material between said plate ends flush with the adjacent ends of said plate outer edges and with the remote boundaries of said bevelled plate ends and tapering the notch so formed substantially to the adjacent corner of said deck member, and then beinding said sheet material in the regions between said deck member and the inner edges of said plates to swing said plates forwardly out of the plane of said sheet and into planes substantially perpendicular to the plane of said sheet and to each other, with the sheet material secured to said plates merging with the sheet material secured to said deck member through coved regions disposed on relatively substantially perpendicular axes, thereby moving the bevelled ends of said plates into mating engagement and concurrently bringing the edges of said notch into abutment to define a closed joint, lying in a plane perpendicular to the plane of said sheet, substantially bisecting the angle between the planes of said plates, and extending into the juncture between said coved regions and through said rearwardly-bent portions.

4. The method of producing a corner construction from a planar sheet of bendable, substantially inductile material having two adjacent, substantially perpendicular edges, which includes the steps of securing to the rear face of such a sheet a deck member having two adjacent, substantially perpendicular edges parallel with, and spaced inwardly from said sheet edges, securing to said face a plate having an inner, longitudinal edge spaced outwardly from, and parallel with, one of said deck member edges, and having an outer edge parallel with its inner edge and spaced inwardly from the parallel edge of said sheet by a dimension at least equal to the thickness of said plate, securing to said face a second plate having an inner, longitudinal edge spaced outwardly from, and parallel with, the other of said deck member edges, and having an outer edge parallel with its inner edge and spaced inwardly from the parallel edge of said sheet by a dimension at least equal to the thickness of said second plate, cutting the sheet, in the region between the adjacent ends of said plates, to free those portions of the sheet projecting beyond the outer edges of said plates for independent bending out of the plane of said sheet, bending said last-mentioned sheet portions rearwardly out of said plane to overlie said plate outer edges, then trimming away the sheet material between said plate ends and tapering the notch so formed substantially to the adjacent corner of said deck member, and then bending said sheet material in the regions between said deck member and the inner edges of said plates to swing said plates forwardly out of the plane of said sheet and into planes substantially perpendicular to the plane of said sheet and to each other, with the sheet material secured to said plates merging with the sheet material secured to said deck member through coved regions disposed on relatively substantially perpendicular axes, thereby bringing the edges of said notch into abutment to define a closed joint, lying in a plane perpendicular to the plane of said sheet, substantially bisecting the angle between the planes of said plates, and extending into the juncture between said coved regions and through the juncture between said rearwardly-bent portions.

5. A blank for use in producing a corner construction, comprising a planar sheet of bendable, substantially inductile material having two adjacent, substantially perpendicular edges, a substantially rigid deck member secured to the rear surface of said sheet and having two adjacent, substantially perpendicular edges parallel with, and spaced inwardly from said sheet edges, a substantially rigid plate secured to said rear sheet face and having an inner, longitudinal edge spaced outwardly from, and parallel with, one of said deck member edges, and having an outer edge parallel with its inner edge and spaced inwardly from the parallel edge of said sheet by a dimension at least equal to the thickness of said plate, a second, substantially rigid plate secured to said rear sheet face and having an inner, longitudinal edge spaced outwardly from, and parallel with, the other of said deck member edges, and having an outer edge parallel with its inner edge and spaced inwardly from the parallel edge of said sheet by a dimension at least equal to the thickness of said second plate, an end of each of said plates overlapping the space between the other plate and the deck member and having its inner corner cut away to define a channel, of a width substantially equal to the spacing between each plate and the deck member, and substantially bisecting the angle between said sheet edges, each of said plate ends further being bevelled, substantially at 45° angles, toward said sheet and away from the other plate, a corner region of said sheet lying between the adjacent ends of said plates being removed to define a notch tapering substantialy to the corner of said deck member at the intersection of said deck member edges.

References Cited in the file of this patent

UNITED STATES PATENTS

| | | |
|---|---|---|
| 597,189 | Prichard | Jan. 11, 1898 |
| 1,883,117 | Tompkins | Oct. 18, 1932 |
| 1,941,922 | Worth | Jan. 2, 1934 |
| 2,069,289 | Swendsen et al. | Feb. 2, 1937 |
| 2,149,882 | Clements | Mar. 7, 1939 |
| 2,189,372 | Stangebye | Feb. 6, 1940 |
| 2,193,018 | Batcheller | Mar. 12, 1940 |
| 2,252,539 | Adams | Aug. 12, 1941 |
| 2,293,184 | Weissert | Aug. 18, 1942 |
| 2,541,768 | Keller | Feb. 13, 1951 |
| 2,648,370 | Beach | Aug. 11, 1953 |
| 2,674,768 | Everhart et al. | Apr. 13, 1954 |
| 2,744,850 | Schofield | May 8, 1956 |
| 2,756,463 | Clements | July 31, 1956 |